United States Patent
Katsumata

(10) Patent No.: US 12,149,807 B2
(45) Date of Patent: Nov. 19, 2024

(54) IMAGE CAPTURING APPARATUS CAPABLE OF SWINGING IMAGE SENSOR

(71) Applicant: CANON KABUSHIKI KAISHA, Tokyo (JP)

(72) Inventor: Momoe Katsumata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 18/150,998

(22) Filed: Jan. 6, 2023

(65) Prior Publication Data

US 2023/0232088 A1 Jul. 20, 2023

(30) Foreign Application Priority Data

Jan. 14, 2022 (JP) ................. 2022-004479

(51) Int. Cl.
*H04N 23/52* (2023.01)
*H04N 23/54* (2023.01)
*H04N 23/68* (2023.01)

(52) U.S. Cl.
CPC ............. *H04N 23/52* (2023.01); *H04N 23/54* (2023.01); *H04N 23/687* (2023.01); *H04N 23/6812* (2023.01)

(58) Field of Classification Search
CPC ...... H04N 23/52; H04N 23/54; H04N 23/687; H04N 23/6812; H04N 23/55; H04N 23/57
See application file for complete search history.

(56) References Cited

U.S. PATENT DOCUMENTS

| | | | |
|---|---|---|---|
| 2020/0296272 A1* | 9/2020 | Kramarov | H04N 23/52 |
| 2021/0289110 A1* | 9/2021 | Ogawa | H05K 1/021 |
| 2022/0272236 A1* | 8/2022 | Yamagata | H04N 23/51 |

FOREIGN PATENT DOCUMENTS

| | | |
|---|---|---|
| JP | 5168047 A | 3/2013 |
| JP | 2019-145929 A | 8/2019 |

* cited by examiner

*Primary Examiner* — Mekonnen D Dagnew
(74) *Attorney, Agent, or Firm* — Cowan, Liebowitz & Latman, P.C.

(57) ABSTRACT

An image capturing apparatus includes an image sensor unit having an image sensor in a state swingable within a plane orthogonal to an image capturing optical axis, a cooling plate connected to the image sensor unit, and a heat dissipation unit attached to a rear side plate. The heat dissipation unit includes a heat dissipation rubber movable in the image capturing optical axis direction between a contact position in contact with the cooling plate and a spaced position spaced from the cooling plate, and a graphite sheet that connects between the heat dissipation rubber and a heat dissipation plate. In the contact position of the heat dissipation rubber, heat from the image sensor is transferred to the rear side plate via the cooling plate, the heat dissipation rubber, the graphite sheet, and the heat dissipation plate.

18 Claims, 7 Drawing Sheets

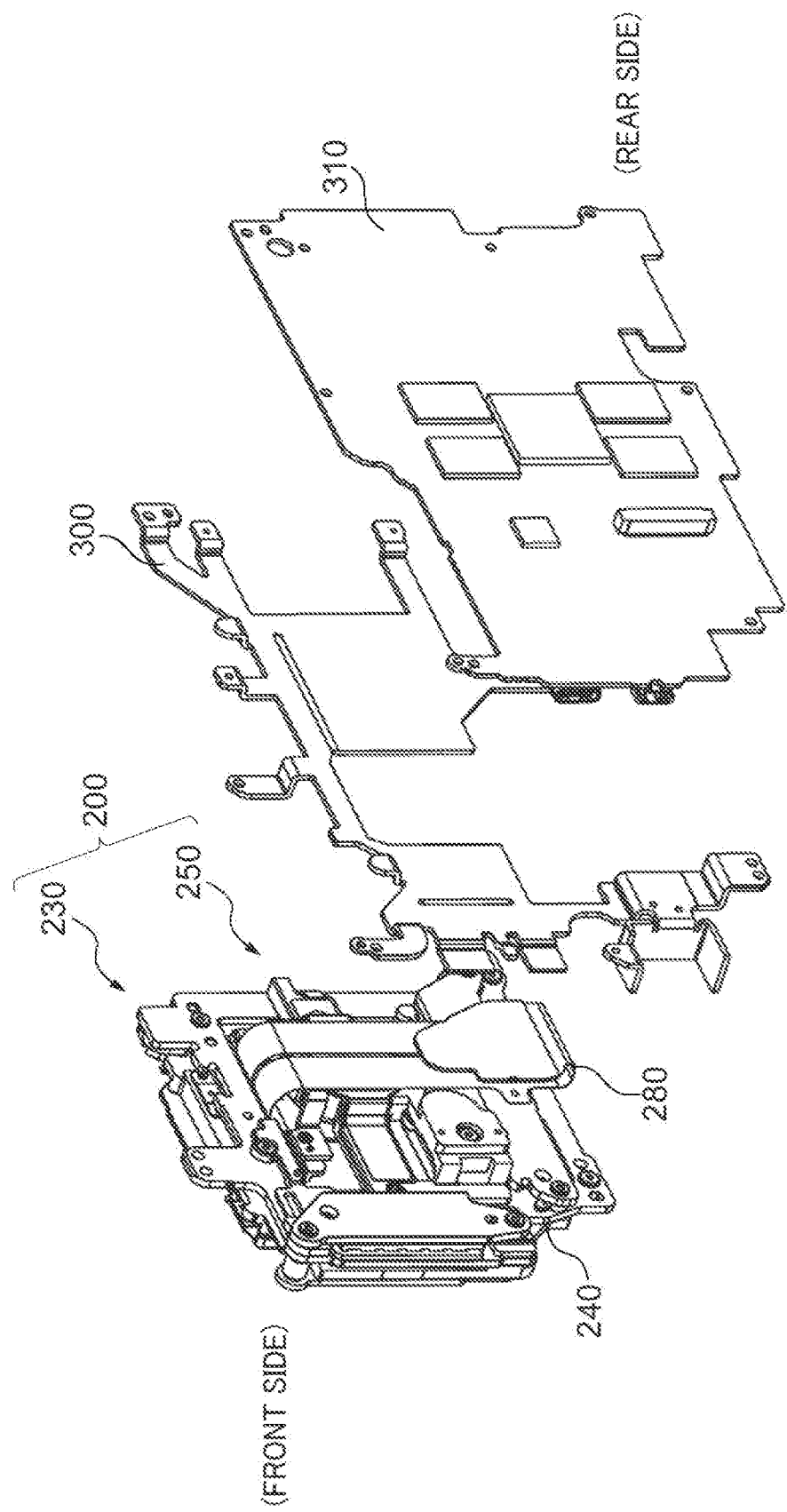

IMAGE CAPTURING APPARATUS CAPABLE OF SWINGING IMAGE SENSOR

BACKGROUND OF THE INVENTION

Field of the Invention

The present invention relates to an image capturing apparatus that is capable of swinging an image sensor, and more particularly to a technique for dissipating heat from an image sensor.

Description of the Related Art

Active efforts have been taken to put on the market an image capturing apparatus equipped with an image blur correction mechanism of an image sensor shift type. Further, in accordance with an increase in the number of pixels and an increase in the reading speed of the image sensor, the temperature of the image sensor is liable to rise. To cope with this, for the image capturing apparatus equipped with the image blur correction mechanism of the image sensor shift type, there is a demand to provide an image sensor unit capable of efficiently dissipating heat from the image sensor.

To meet such a requirement, for example, Japanese Patent No. 5168047 discloses a configuration in which a ring-shaped metal member is disposed in the vicinity of an image sensor unit, and the image sensor unit and the metal member is connected by flexible members to dissipate heat from the metal member. Further, Japanese Laid-Open Patent Publication (Kokai) No. 2019-145929 discloses a configuration in which a heat dissipation member is disposed close to an image sensor unit equipped with an image blur correction mechanism and the image blur correction mechanism is driven to bring the image sensor unit into contact with the heat dissipation member, to thereby transfer heat generated by an image sensor of the image sensor unit to the heat dissipation member.

However, in the configuration disclosed in Japanese Patent No. 5168047, the image sensor unit and the metal member are connected by the flexible members, and hence the elasticity of the flexible members becomes a driving load when the image sensor is swung. Further, in the configuration disclosed in Japanese Laid-Open Patent Publication (Kokai) No. 2019-145929, when the image sensor unit is brought into contact with the heat dissipation member, the image sensor unit is moved outside an image shake correction area where the image sensor unit corrects an image shake at the time of image capturing, and hence it is impossible to perform image capturing before the image sensor unit is returned to within the image shake correction area.

SUMMARY OF THE INVENTION

The present invention provides an image capturing apparatus that is capable of positively dissipating heat from an image sensor without increasing a driving load of a movable part including the image sensor or moving the image sensor to a particular position.

In a first aspect of the present invention, there is provided an image capturing apparatus including a movable part having an image sensor, a fixed part that holds the movable part such that the movable part is swingable within a plane orthogonal to an image capturing optical axis, a first metal member that is connected to the movable part, and a heat dissipation unit that is attached to the fixed part, wherein the heat dissipation unit includes a contact member disposed such that the contact member is movable in an image capturing optical axis direction between a contact position where the contact member is in contact with the first metal member and a spaced position where the contact member is spaced from the first metal member, and a heat conducting member that connects between the contact member and a predetermined member, and wherein in a state in which the contact member is in the contact position, heat generated by the image sensor is transferred to the predetermined member via the first metal member, the contact member, and the heat conducting member.

In a second aspect of the present invention, there is provided an image capturing apparatus including a first unit that has an image sensor and is movable in a direction orthogonal to an optical axis, a heat dissipation member that is different from the first unit, a second unit that has a heat conducting sheet member disposed side by side with the first unit in a direction parallel to the optical axis and is connected to the heat dissipation member, wherein the heat conducting sheet member is held such that the heat conducting sheet member is movable in the direction parallel to the optical axis between a first position where the heat conductive sheet member is in contact with a flat portion of the first unit and a second position where the heat conductive sheet member is spaced from the first unit.

In a third aspect of the present invention, there is provided an image capturing apparatus including a movable part having an image sensor, a fixed part that holds the movable part such that the movable part is swingable within a plane orthogonal to an image capturing optical axis, a first metal member that is connected to the movable part, and a heat dissipation unit that is attached to the fixed part, wherein the heat dissipation unit includes a first contact member disposed such that the first contact member is movable in an image capturing optical axis direction between a contact position where the first contact member is in contact with the first metal member and a spaced position where the first contact member is spaced from the first metal member, a second metal member that is disposed such that the second metal member is opposed to the first metal member in the image capturing optical axis direction, and is connected to the first contact member and disposed such that the second metal member is movable in the image capturing optical axis direction in unison with the first contact member, a third metal member that is held by a casing of the image capturing apparatus and is connected to neither the movable part nor the fixed part, a heat conducting member that connects between the second metal member and the third metal member, a circuit board having heat generating components mounted thereon, and a second contact member that is disposed on the second metal member and is in contact with the circuit board in a state in which the first contact member is in the contact position, and wherein in the state in which the first contact member is in the contact position, heat generated by the image sensor is transferred to the third metal member via the first metal member, the first contact member, the second metal member, and the heat conducting member, and heat generated by the heat generating components is transferred to the third metal member via the circuit board, the second contact member, and the heat conducting member.

According to the present invention, it is possible to positively dissipate heat from the image sensor without increasing a driving load of the movable part including the image sensor and moving the image sensor to a particular position.

Further features of the present invention will become apparent from the following description of exemplary embodiments (with reference to the attached drawings).

BRIEF DESCRIPTION OF THE DRAWINGS

FIG. 2 is an exploded perspective view of an image capturing unit and associated components therearound.

DESCRIPTION OF THE EMBODIMENTS

The present invention will now be described in detail below with reference to the accompanying drawings showing embodiments thereof.

Figure 1:
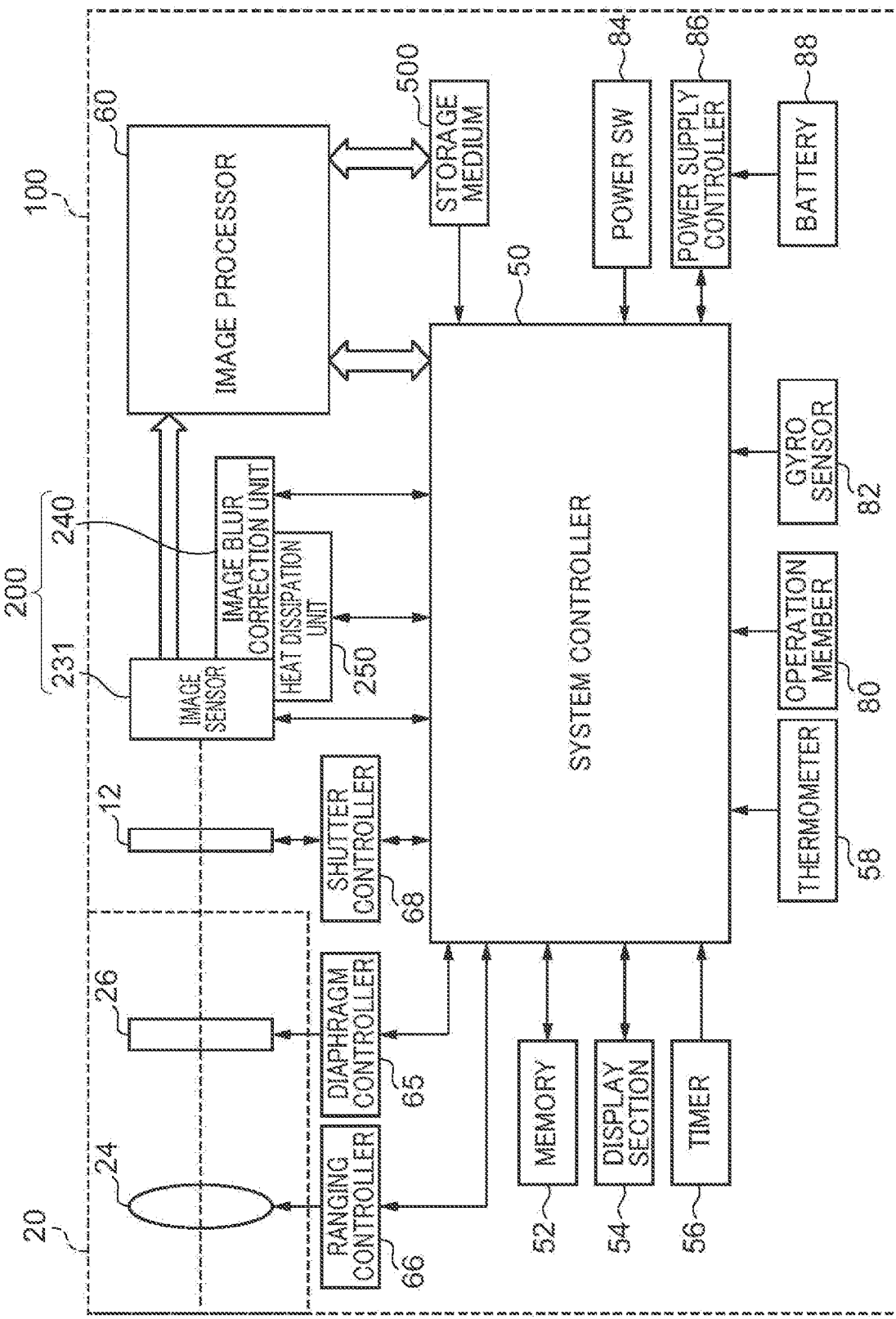
FIG. 1 is a general schematic block diagram of a digital camera as an image capturing apparatus according to embodiments.

FIG. 1 is a general schematic block diagram of a digital camera 100 as an example of an image capturing apparatus according to embodiments. The digital camera 100 includes a photographic lens 20, a shutter 12, a ranging controller 66, a diaphragm controller 65, a shutter controller 68, an image capturing unit 200, a gyro sensor 82, a system controller 50, a memory 52, an image processor 60, a thermometer 58, and an operation member 80. Further, the digital camera 100 includes a display section 54, a timer 56, a power switch 84, a power supply controller 86, a battery 88, and a storage medium 500.

The photographic lens 20 includes a group of a plurality of lenses including at least an auto focus (AF) lens 24, and a diaphragm 26. The image capturing unit 200 includes an image sensor unit 230 (see FIG. 2), an image sensor image blur correction unit 240 (hereinafter referred to as the "image blur correction unit 240"), and an image sensor heat dissipation unit 250 (hereinafter referred to as the "heat dissipation unit 250"). The image sensor unit 230 has an image sensor 231.

The photographic lens 20 causes incident light to form an optical image on an imaging plane of the image sensor 231. The diaphragm 26 adjusts the amount of light entering the image sensor 231. The shutter 12 is opened and closed to control the amount of exposure to the image sensor 231. The image sensor 231 is a photoelectric conversion device that converts an optical image to electrical signals, such as a CCD or a CMOS sensor. A light flux incident to the photographic lens 20 is guided to the image sensor 231 through the diaphragm 26 and the shutter 12 and is imaged on the imaging plane of the image sensor 231 as an optical image.

According to commands from the system controller 50, the ranging controller 66 controls the operation of moving the AF lens 24 in an optical axis direction, the diaphragm controller 65 controls the driving of the diaphragm 26, and the shutter controller 68 controls the operation of opening and closing the shutter 12.

The gyro sensor 82 detects a shake amount (direction and magnitude of a shake) of the digital camera 100. The image blur correction unit 240 performs image shake correction by an image sensor shift method in which an image shake is corrected by driving the image sensor 231 at least within a plane orthogonal to an optical axis, according to the shake amount detected by the gyro sensor 82. The heat dissipation unit 250 suppresses the temperature rise of the image sensor 231 by receiving heat from the image sensor 231 on condition that the amount of heat generated by the image sensor 231 during image capturing is large (in other words, on condition that power consumption during image capturing is large).

The system controller 50 is comprised of a CPU, and controls the overall operation of the digital camera 100 by executing predetermined programs stored in the memory 52. For example, the system controller 50 controls the shutter 12, the AF lens 24, and the diaphragm 26 to perform AF processing and AE processing based on results of calculations performed by the image processor 60 on image data acquired by the image sensor 231. Note that the system controller 50 is also used as determination means for determining whether or not to execute a variety of operations of the digital camera 100.

The memory 52 includes a ROM that stores constants, variables, programs, and so forth, for the operation of the system controller 50, and a RAM that is used for loading programs and temporarily storing data. Further, the memory 52 stores a state of the image sensor unit 230 held by the image blur correction unit 240. The thermometer 58 measures the temperature of heat generating components equipped in the digital camera 100, including the image sensor 231.

The operation member 80 is comprised of buttons and switches for instructing selection and setting of a variety of functions, a photographing operation, and image reproduction display, to the system controller 50. The power switch 84 switches on and off the power supply of the digital camera 100. The power supply controller 86 is comprised of a battery detection circuit, a DC/DC converter, and a switching circuit for switching blocks to be energized. The battery 88 supplies power to the digital camera 100. The power supply controller 86 detects the type and remaining amount of the battery 88, and based on a result of the detection and an instruction from the system controller 50, supplies the required voltages to components including the storage medium 500 for respective required time periods. The storage medium 500 is removably attachable to the digital camera 100 and stores image data of photographed images and the like.

FIG. 2 is a perspective view showing a general arrangement of the image capturing unit 200, and a holding sheet metal 300 and a printed circuit board 310 which are arranged on a rear side of the image capturing unit 200. As described above, the image capturing unit 200 is basically comprised of the image sensor unit 230, the image blur correction unit 240, and the heat dissipation unit 250.

The holding sheet metal 300 (third metal member in the first embodiment) disposed on the rear side of the image capturing unit 200 holds the printed circuit board 310 and is connected (fixed) to a casing, not shown, of the digital camera 100. On the printed circuit board 310, there are mounted a variety of electrical components and electronic components, including the system controller 50 and the image processor 60. The image sensor unit 230 and the printed circuit board 310 are electrically connected by a flexible printed circuit board 280, and image signals output from the image sensor 231 are transmitted to the printed circuit board 310 via the flexible printed circuit board 280. Note that the holding sheet metal 300 is not connected (linked) to the image capturing unit 200.

Figure 3A:
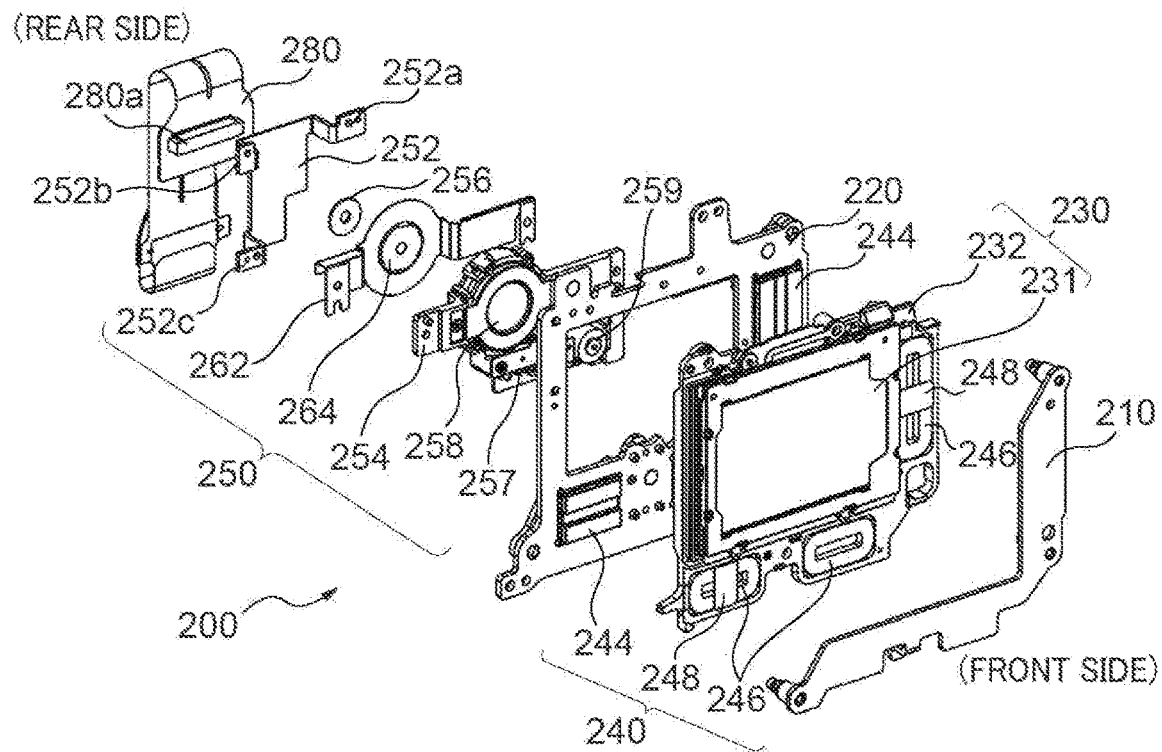
FIGS. 3A and 3B are perspective views each showing the arrangement of the image capturing unit, a holding sheet metal, and a printed circuit board.
Figure 3B:
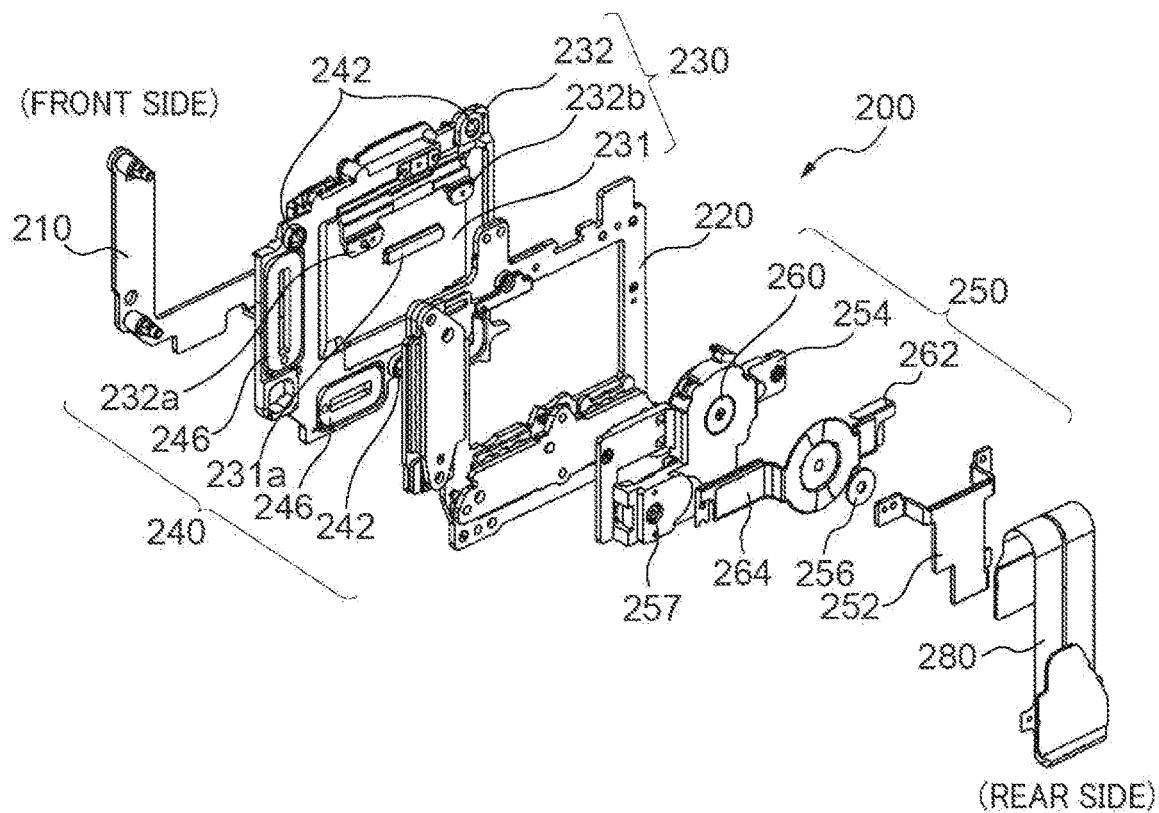

Next, the arrangement of the image blur correction unit 240 and the heat dissipation unit 250 as components of the image capturing unit 200 will described. FIGS. 3A and 3B are exploded perspective views of the image capturing unit 200, and the direction of viewing the image capturing unit 200 is different between FIGS. 3A and 3B.

The image capturing unit 200 has a structure in which the image sensor unit 230 which is a movable part is movably held between a front side plate 210 and a rear side plate 220 which form a fixed part. The front side plate 210 and the rear side plate 220 are each formed of a metal plate. The rear side plate 220 is fixed to the casing, not shown, of the digital camera 100. The front side plate 210 is fixed to the rear side plate 220 across the image sensor unit 230 held between the front side plate 210 and the rear side plate 220.

The image sensor unit 230 includes the image sensor 231 and an image sensor holder 232 for holding the image sensor 231. Around the image sensor 231, three balls 242 are arranged between the image sensor holder 232 and the rear side plate 220 such that the three balls 242 surround an image capturing optical axis (not shown). The three balls 242 are rollable, and this causes the image sensor unit 230 to be held between the front side plate 210 and the rear side plate 220 such that the image sensor unit 230 is swingable within a plane orthogonal to the image capturing optical axis.

A plurality of magnets 244 are arranged on the rear side plate 220, and a plurality of coils 246 are arranged on the image sensor holder 232 such that the coils 246 are opposed to the magnets 244, respectively. Electric power is supplied from a power supply circuit, not shown, to the coils 246, and swing control of the image sensor unit 230 is performed by using a repulsive force and an attraction force generated by an interaction between magnetic fields generated by the coils 246 and magnetic fields generated by the magnets 244. In general, the image blur correction unit 240 is controlled such that the image sensor unit 230 is maintained in an image capturing center position, and is further controlled to move the image sensor unit 230 in a direction in which an image shake of the digital camera 100, caused by a photographer, is canceled.

Metal plates 248 are each disposed on a front surface (surface on the front side) of an associated one of the coils 246, and the magnets 244 attract the metal plates 248, respectively, whereby the image sensor holder 232 and the rear side plate 220 are maintained in a state brought into contact with the balls 242. This sets a flange back position of the image sensor 231 within the digital camera 100 to a predetermined position.

The heat dissipation unit 250 will be described in detail below with reference to FIGS. 3A and 3B, and FIGS. 4A and 4B. As shown in FIGS. 3A and 3B, the heat dissipation unit 250 includes an image sensor cooling plate 252, a heat dissipation base 254, a graphite sheet 264, an image sensor heat dissipation rubber 256, and a heat dissipation plate 262. In the following description, the image sensor cooling plate 252 is referred to as the "cooling plate 252", and the image sensor heat dissipation rubber 256 is referred to as the "heat dissipation rubber 256".

The cooling plate 252 (first metal member in the first embodiment) has leg portions 252a, 252b, and 252c. Further, the image sensor holder 232 is provided with holding portions 232a, 232b, and 232c. Note that the holding portion 232c is hidden by the rear side plate 220 and hence does not appear in FIG. 3B. The leg portions 252a to 252c are fastened to the holding portions 232a to 232c with screws, respectively, whereby the cooling plate 252 is fixed to the image sensor holder 232. Thus, heat generated by the image sensor 231 is transferred to the cooling plate 252 via the image sensor holder 232.

The heat dissipation base 254 holds a gear 257, a cam 258, a motor 259, and a heat transfer plate 260, and is fixed to the rear side plate 220. The graphite sheet 264 is a heat conducting member which is held between the heat transfer plate 260 and the heat dissipation rubber 256 (contact member) and is connected to the heat dissipation plate 262. A material which has elasticity and is high in heat conductivity (high in thermal conductivity) is preferably used for the heat dissipation rubber 256.

The heat dissipation plate 262 (second metal member in the first embodiment) is disposed on the rear side of the heat dissipation base 254 and is fixed to the rear side plate 220 together with the heat dissipation base 254. Here, a connector 280a of the flexible printed circuit board 280 is connected to a connector 231a of the image sensor 231. The flexible printed circuit board 280 is drawn out from the connecting position to the connector 231a in the image capturing optical axis direction to the rear side of the heat dissipation unit 250 such that the flexible printed circuit board 280 extends astride an upper end of the heat dissipation unit 250. For this reason, the heat dissipation base 254 and the heat dissipation plate 262 are fixed to the rear side plate 220 in a lateral direction.

By energizing the motor 259 to drive the motor 259, it is possible to move the heat dissipation rubber 256 in the image capturing optical axis direction between a contact position where the heat dissipation rubber 256 is in contact with the cooling plate 252 and a spaced position where the heat dissipation rubber 256 is spaced from the cooling plate 252. That is, by driving the motor 259, the heat dissipation rubber 256 is advanced and retreated in the image capturing optical axis direction via the gear 257, the cam 258, the heat transfer plate 260, and the graphite sheet 264 such that the heat dissipation rubber 256 is brought into contact with and is spaced from the cooling plate 252.

Figure 4A:
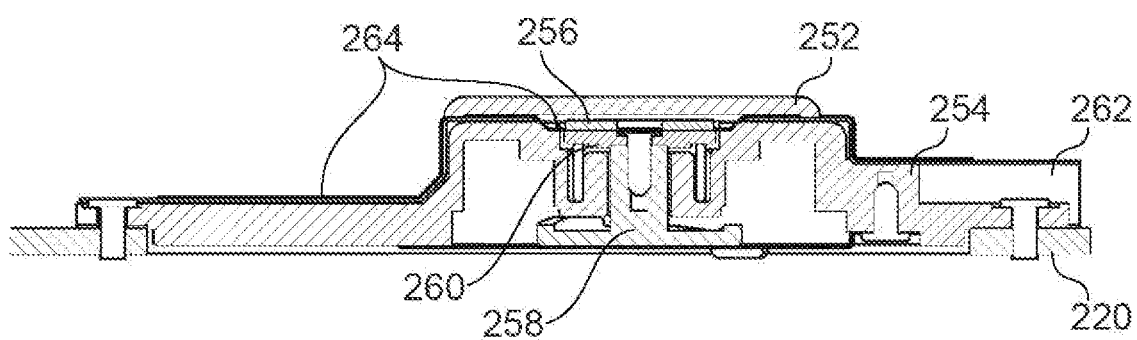
FIGS. 4A and 4B are cross-sectional views of a heat dissipation unit in a first embodiment.
Figure 4B:
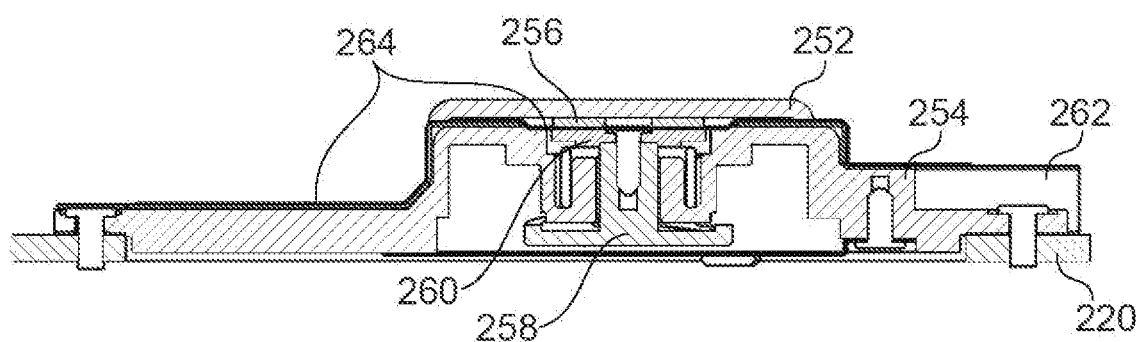

FIGS. 4A and 4B are cross-sectional views of the heat dissipation unit 250 in the first embodiment. More specifically, FIG. 4A shows a state in which heat from the cooling plate 252 is not transferred to the heat dissipation rubber 256. Further, FIG. 4B shows a state in which heat from the cooling plate 252 is transferred to the heat dissipation rubber 256.

In the state shown in FIG. 4A, in which the heat dissipation rubber 256 is not in contact with the cooling plate 252, the heat dissipation unit 250 does not become a driving load of the image sensor unit 230 which is the movable part, and hence it is possible to cause the image blur correction unit 240 to fully perform its function.

On the other hand, in the state shown in FIG. 4B, in which the heat dissipation rubber 256 is in contact with the cooling plate 252, heat from the image sensor 231 is transferred to the rear side plate 220 via the cooling plate 252, the heat dissipation rubber 256, the graphite sheet 264, and the heat dissipation plate 262. Thus, since it is possible to transfer heat generated by the image sensor 231 to the rear side plate 220 via the heat dissipation unit 250, it is possible to suppress the temperature rise of the image sensor 231. In the state shown in FIG. 4B, since the heat dissipation rubber 256 is in contact with the cooling plate 252, it is substantially impossible to swing the image sensor unit 230. That is, when the heat dissipation unit 250 is operated, driving of the image blur correction unit 240 is restricted. However, the image sensor unit 230 is held in the image capturing center position, and hence it is possible to perform image capturing. Note that the mage capturing device unit 230 is not necessarily required to be held in the image capturing center position, but is only required to be held in a position within an imageable range. The imageable range refers to a range of positions where vignetting is not caused by a member disposed on the front side of the image sensor 231. Further, since the image sensor unit 230 is held in a position within the imageable range, even in a configuration in which image capturing is not performed when the heat dissipation unit 250 is in operation, it is possible to perform image capturing immediately after the operation of the heat dissipation unit 250 is terminated.

Note that in a state in which the heat dissipation rubber 256 is in contact with the cooling plate 252, for efficient heat transfer by increased close contactness, it is desirable that the heat dissipation rubber 256 is brought into pressure contact with the cooling plate 252. Further, although in the present embodiment, heat transfer is performed by the contact between the cooling plate 252 and the heat dissipation rubber 256, the graphite sheet 264 and the heat dissipation rubber 256 may be replaced with each other. In this case, the heat dissipation rubber 256 is made movable between a pressing position where the graphite sheet 264 is brought into close contact with the cooling plate 252 and a spaced position where the graphite sheet 264 is spaced from the cooling plate 252. Then, the heat dissipation rubber 256 functions as a pressing member that presses the graphite sheet 264 against the cooling plate 252 when in the pressing position, so as to bring the graphite sheet 264 into close contact with the cooling plate 252. In this case, the heat dissipation rubber 256 is required to have elasticity but is not necessarily required that a material having high thermal conductivity is used for the heat dissipation rubber 256. Further, in this arrangement, the friction resistance is smaller than in the arrangement in which the heat dissipation rubber 256 is brought into contact with the cooling plate 252, and hence it is possible to move the image sensor unit 230 in a state in which the graphite sheet 264 is in contact with the cooling plate 252. That is, although the driving load becomes larger than when the graphite sheet 264 is not in contact with the cooling plate 252, it is possible to perform image capturing while driving the image blur correction unit 240.

Although in the present embodiment, the arrangement in which the heat dissipation plate 262 is brought into thermal contact with the rear side plate 220 is employed, in a case where the heat dissipation plate 262 is not provided, the arrangement in which the graphite sheet 264 is in contact with the rear side plate 220 can be employed.

Next, a second embodiment of the present invention will be described. The second embodiment is different from the second embodiment in the configuration of the heat dissipation unit. Similar to the heat dissipation unit 250 in the first embodiment, a heat dissipation unit in the second embodiment transfers heat generated by the image sensor 231 to the rear side plate 220, but is different from the first embodiment in that the heat dissipation unit further transfers heat to the holding sheet metal 300.

Figure 5:
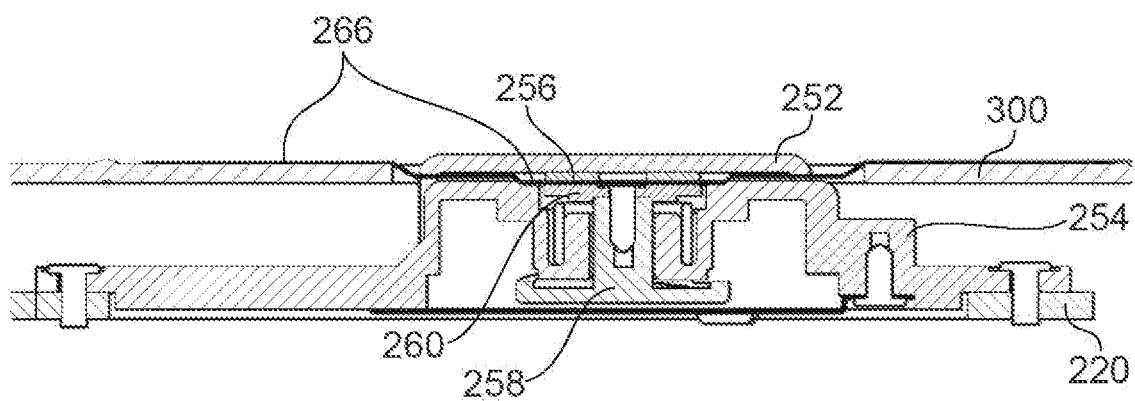
FIG. 5 is a cross-sectional view of a heat dissipation unit in a second embodiment.

FIG. 5 is a cross-sectional view of the heat dissipation unit in the second embodiment and corresponds to FIG. 4B. In the heat dissipation unit in the second embodiment, a graphite sheet 266 is disposed between the heat transfer plate 260 and the heat dissipation rubber 256, and is connected to the holding sheet metal 300.

By driving the motor 259, it is possible to advance and retreat the heat dissipation rubber 256, via the gear 257, the cam 258, the heat transfer plate 260, and the graphite sheet 266, between the contact position where the heat dissipation rubber 256 is in contact with the cooling plate 252 and the spaced position where the heat dissipation rubber 256 is spaced from the cooling plate 252. Heat of the cooling plate 252 is transferred to the holding sheet metal 300 via the heat dissipation rubber 256 and the graphite sheet 266.

That is, in the second embodiment, compared with the first embodiment, heat generated by the image sensor 231 is transferred not only to the rear side plate 220, but also to the holding sheet metal 300. Here, the holding sheet metal 300 is not connected to the image capturing unit 200, and hence the holding sheet metal 300 can be formed as a relatively large metal member. Thus, it is possible to obtain a larger effect of suppressing the temperature rise of the image sensor 231.

Next, a third embodiment of the present invention will be described. The third embodiment is different from the first and second embodiments in the configuration of the heat dissipation unit. A heat dissipation unit in the third embodiment transfers heat generated by the image sensor 231 and heat generated by the printed circuit board 310 to the holding sheet metal 300.

Figure 6:
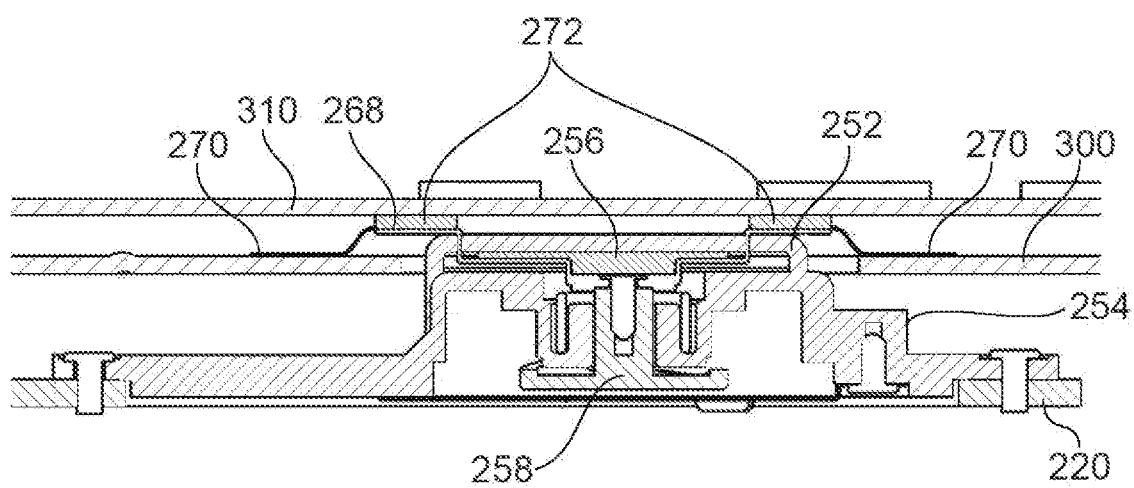
FIG. 6 is a cross-sectional view of a heat dissipation unit in a third embodiment.

FIG. 6 is a cross-sectional view of the heat dissipation unit in the third embodiment and corresponds to FIG. 4B. In the configuration of the heat dissipation unit in the third embodiment, description of the same components as those of the heat dissipation unit in the second embodiment is omitted.

The heat dissipation unit in the third embodiment includes a board heat dissipation plate 268 (second metal member in the third embodiment), a graphite sheet 270, and a board heat dissipation rubber 272 (second contact member). The board heat dissipation plate 268 holds the heat dissipation rubber 256 (first contact member) and is held by the heat dissipation base 254 such that the board heat dissipation plate 268 is movable in the image capturing optical axis direction. The graphite sheet 270 connects between the board heat dissipation plate 268 and the holding sheet metal 300 (third metal member in the first embodiment). The board heat dissipation rubber 272 is disposed on the board heat dissipation plate 268 between the board heat dissipation plate 268 and the printed circuit board 310 so as to transfer heat from the printed circuit board 310 to the graphite sheet 270.

By driving the motor 259, it is possible to advance and retreat the heat dissipation rubber 256 (first contact member) via the gear 257, the cam 258, and the board heat dissipation plate 268 between the contact position where the heat dissipation rubber 256 is in contact with the cooling plate 252 (first metal member in the third embodiment) and the spaced position where the heat dissipation rubber 256 is spaced from the cooling plate 252. At this time, the board heat dissipation plate 268 is advanced and retreated in unison with the sheet dissipation rubber 256, and simultaneously with advancing and retreating of these components, the board heat dissipation rubber 272 is advanced and retreated in unison with the board heat dissipation plate 268 to and from the printed circuit board 310. When the heat dissipation rubber 256 is in the contact position where the heat dissipation rubber 256 is in contact with the cooling plate 252, the board heat dissipation rubber 272 is also in contact with the printed circuit board 310.

Since the heat dissipation rubber 256 is brought into contact with the cooling plate 252, heat generated by the image sensor 231 is transferred to the holding sheet metal 300 via the cooling plate 252, the heat dissipation rubber 256, the board heat dissipation plate 268, and the graphite sheet 270. Further, since the board heat dissipation rubber 272 is brought into contact with the printed circuit board 310, heat generated by heat generating components of the printed circuit board 310 is transferred to the holding sheet metal 300 via the printed circuit board 310, the board heat dissipation rubber 272, and the graphite sheet 270. Note that in a state in which the board heat dissipation rubber 272 is in contact with the printed circuit board 310, for efficient heat transfer by increased close contactness, it is desirable that the heat dissipation rubber 272 is brought into pressure contact with the printed circuit board 310.

Thus, in the third embodiment, it is possible to transfer heat generated by the image sensor 231 to the holding sheet metal 300 and transfer heat generated by the printed circuit board 310 to the holding sheet metal 300, whereby it is possible to suppress the temperature rise of the image sensor 231 and the printed circuit board 310.

Figure 7:
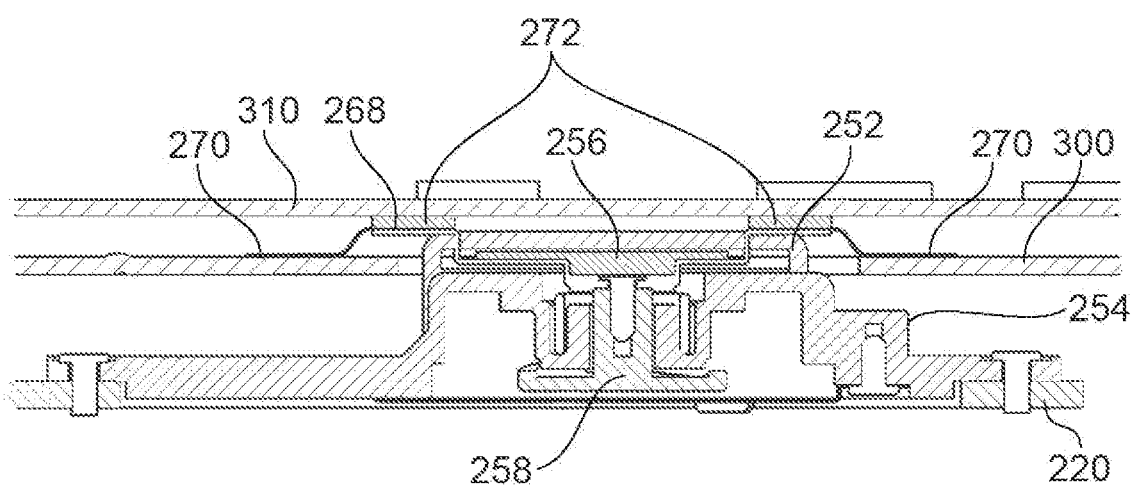
FIG. 7 is a cross-sectional view of a variation of the heat dissipation unit in the third embodiment.

Note that although in the heat dissipation unit in the third embodiment, heat transfer from the image sensor 231 to the holding sheet metal 300 and heat transfer from the printed circuit board 310 to the holding sheet metal 300 are simultaneously performed, heat transfer from the image sensor 231 to the holding sheet metal 300 and heat transfer from the printed circuit board 310 to the holding sheet metal 300 may be stepwise performed. For example, as shown in FIG. 7, the thickness of the heat dissipation rubber 256 and the thickness of the board heat dissipation rubber 272 are adjusted. Then, in a step in which the board heat dissipation plate 268 is moved to bring the board heat dissipation rubber 272 and the printed circuit board 310 into contact with each other, the heat dissipation rubber 256 is prevented from being brought into contact with the cooling plate 252. After that, when the board heat dissipation plate 268 is further moved to deform the board heat dissipation rubber 272, the heat dissipation rubber 256 is brought into contact with the cooling plate 252. Thus, it is possible to perform heat transfer from the printed circuit board 310 before heat transfer from the image sensor 231.

Note that by reversing the relationship of the thickness between the heat dissipation rubber 256 and the board heat dissipation rubber 272, it is possible to perform heat transfer from the image sensor 231 before heat transfer from the printed circuit board 310. Further, heat transfer from the image sensor 231 and the printed circuit board 310 to the holding sheet metal 300 can also be stepwise performed not by adjusting the thickness of the heat dissipation rubber 256 and the thickness of the board heat dissipation rubber 272, but by adjusting the shape of the board heat dissipation plate 268. The same effect can also be obtained by changing the arrangement or dimensions of the other members. That is, by maintaining the position of the board heat dissipation plate 268 in a state in which one of the board heat dissipation rubber 272 and the heat dissipation rubber 256 is in the contact state, it is also possible to transfer only heat generated by one of the image sensor 231 and the printed circuit board 310 to the holding sheet metal 300.

Incidentally, in general, in the image capturing apparatus, such as a digital camera, the heat dissipation path from the printed circuit board 310 is set so as to prevent the temperature rise of the exterior (not shown) of the digital camera 100 under the normal image capturing condition. On the other hand, there is a case where it is desired to increase the number of heat dissipation paths under an image capturing condition that the temperatures of the electrical components mounted on the printed circuit board 310, including the system controller 50, become high. The heat dissipation unit in the third embodiment makes it possible to obtain the effect of suppressing local temperature rise within the digital camera 100 by increasing the number of heat dissipation paths from the printed circuit board 310 to the holding sheet metal 300.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-004479 filed Jan. 14, 2022, which is hereby incorporated by reference herein in its entirety.

What is claimed is:

1. An image capturing apparatus including:
   a movable part having an image sensor,
   a fixed part that holds the movable part such that the movable part is swingable within a plane orthogonal to an image capturing optical axis,
   a first metal member that is connected to the movable part, and
   a heat dissipation unit that is attached to the fixed part, wherein the heat dissipation unit comprises:
   a contact member disposed such that the contact member is movable in an image capturing optical axis direction between a contact position where the contact member is in contact with the first metal member and a spaced position where the contact member is spaced from the first metal member; and
   a heat conducting member that connects between the contact member and a predetermined member, and
   wherein in a state in which the contact member is in the contact position, heat generated by the image sensor is transferred to the predetermined member via the first metal member, the contact member, and the heat conducting member.

2. The image capturing apparatus according to claim 1, wherein the contact member has elasticity and thermal conductivity.

3. The image capturing apparatus according to claim 1, wherein image capturing can be performed by the image sensor in a state in which the contact member is in the contact position.

4. The image capturing apparatus according to claim 1, wherein the predetermined member is the fixed part.

5. The image capturing apparatus according to claim 1, wherein the heat dissipation unit has a second metal member attached to the fixed part, and
   wherein the predetermined member is the second metal member.

6. The image capturing apparatus according to claim 1, wherein the image capturing apparatus has a third metal member that is held by a casing of the image capturing apparatus and is connected to neither the movable part nor the fixed part, and
   wherein the predetermined member is the third metal member.

7. The image capturing apparatus according to claim 1, wherein the heat conducting member is a graphite sheet.

8. An image capturing apparatus comprising:
   a first unit that has an image sensor and is movable in a direction orthogonal to an optical axis;

a heat dissipation member that is different from the first unit;

a second unit that has a heat conducting sheet member disposed side by side with the first unit in a direction parallel to the optical axis and is connected to the heat dissipation member, wherein the heat conducting sheet member is held such that the heat conducting sheet member is movable in the direction parallel to the optical axis between a first position where the heat conductive sheet member is in contact with a flat portion of the first unit and a second position where the heat conductive sheet member is spaced from the first unit.

9. The image capturing apparatus according to claim 8, wherein image capturing can be performed by the image sensor in a state in which the heat conducting sheet member is in the first position.

10. The image capturing apparatus according to claim 8, wherein the heat conducting sheet member is a graphite sheet.

11. The image capturing apparatus according to claim 8, wherein the first position is a position in which the heat conducting sheet member is more spaced in the direction parallel to the optical axis from the image sensor than when the heat conducting sheet member is in the second position.

12. The image capturing apparatus according to claim 8, wherein the second unit is disposed between the image sensor and the flat portion in the direction parallel to the optical axis.

13. The image capturing apparatus according to claim 8, wherein the first unit is movable with respect to the second unit in a direction orthogonal to the optical axis.

14. The image capturing apparatus according to claim 8, wherein the heat conducting sheet member is movable between the first position and the second position by driving a motor included in the second unit.

15. An image capturing apparatus including:
a movable part having an image sensor,
a fixed part that holds the movable part such that the movable part is swingable within a plane orthogonal to an image capturing optical axis,
a first metal member that is connected to the movable part, and
a heat dissipation unit that is attached to the fixed part,
wherein the heat dissipation unit comprises:
a first contact member disposed such that the first contact member is movable in an image capturing optical axis direction between a contact position where the first contact member is in contact with the first metal member and a spaced position where the first contact member is spaced from the first metal member;
a second metal member that is disposed such that the second metal member is opposed to the first metal member in the image capturing optical axis direction, and is connected to the first contact member and disposed such that the second metal member is movable in the image capturing optical axis direction in unison with the first contact member;
a third metal member that is held by a casing of the image capturing apparatus and is connected to neither the movable part nor the fixed part;
a heat conducting member that connects between the second metal member and the third metal member;
a circuit board having heat generating components mounted thereon; and
a second contact member that is disposed on the second metal member and is in contact with the circuit board in a state in which the first contact member is in the contact position, and
wherein in the state in which the first contact member is in the contact position, heat generated by the image sensor is transferred to the third metal member via the first metal member, the first contact member, the second metal member, and the heat conducting member, and heat generated by the heat generating components is transferred to the third metal member via the circuit board, the second contact member, and the heat conducting member.

16. The image capturing apparatus according to claim 15, wherein the first contact member and the second contact member have elasticity and thermal conductivity.

17. The image capturing apparatus according to claim 15, wherein image capturing can be performed by the image sensor in the state in which the first contact member is in the contact position.

18. The image capturing apparatus according to claim 15, wherein the heat conducting member is a graphite sheet.

* * * * *